Patented Apr. 22, 1930

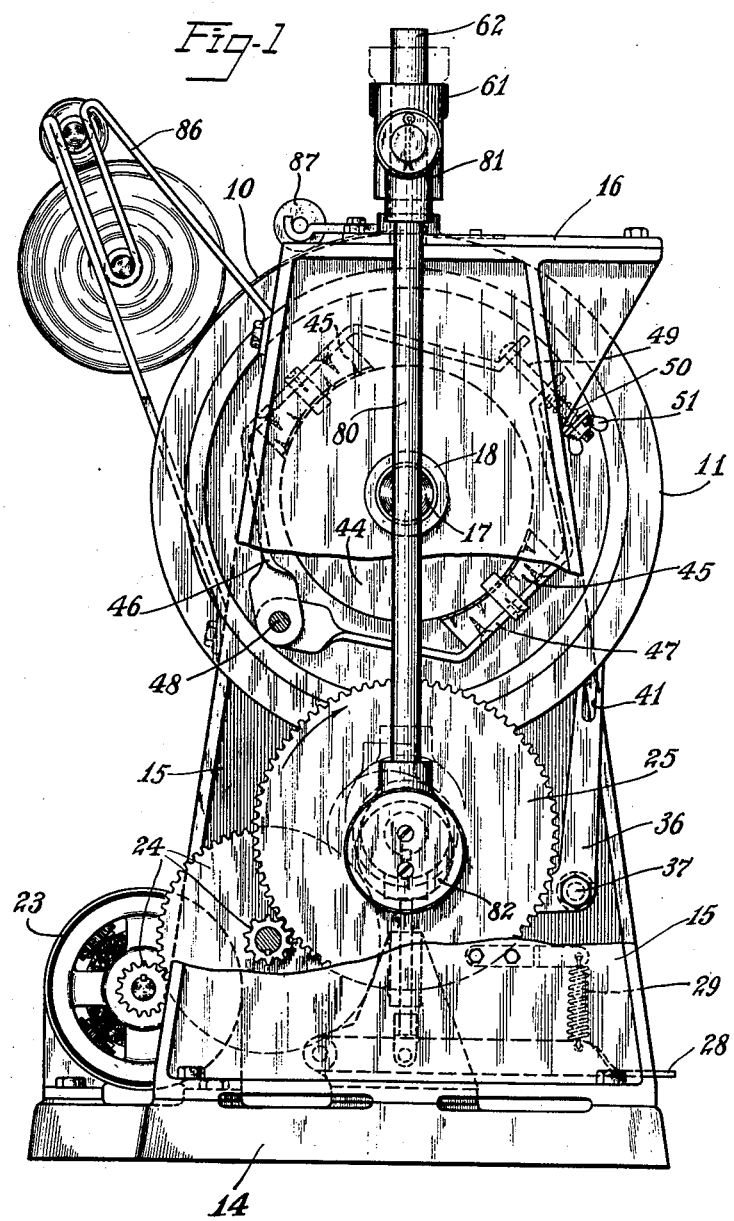

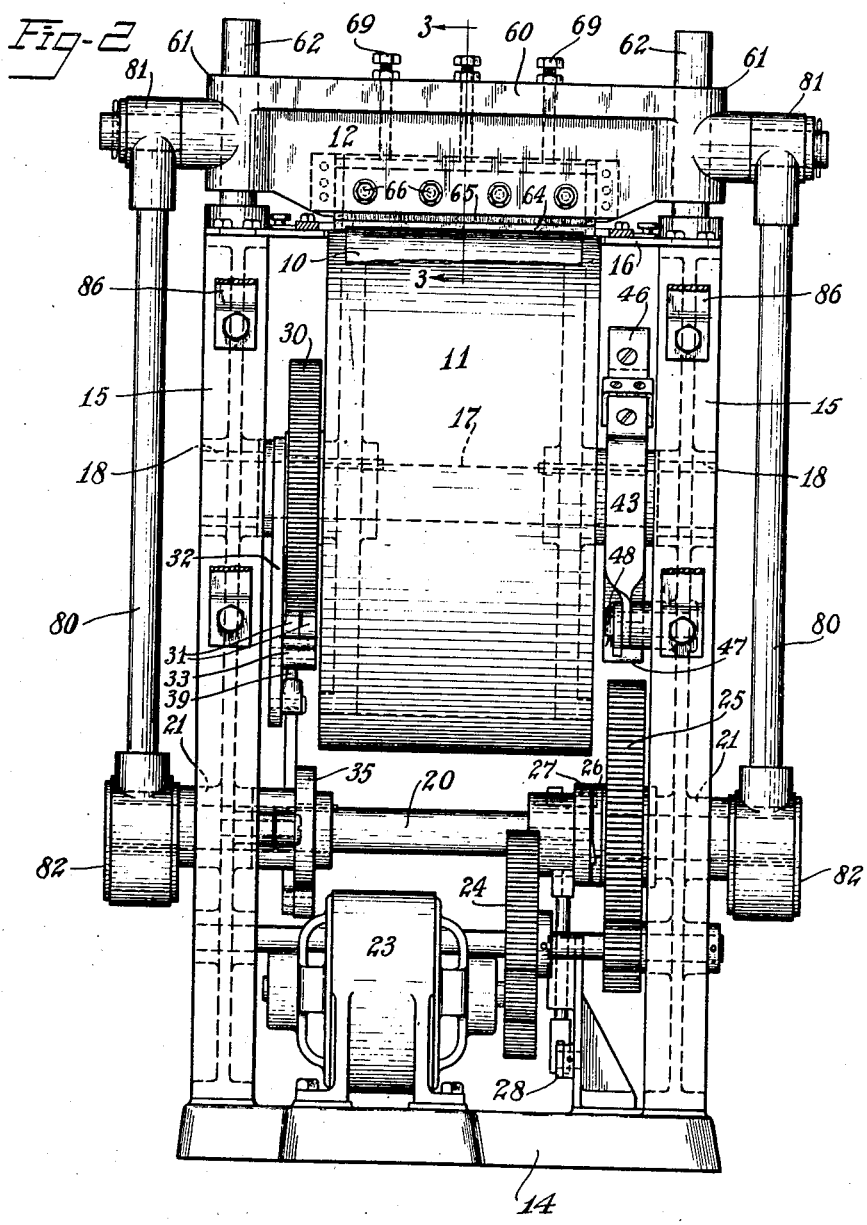

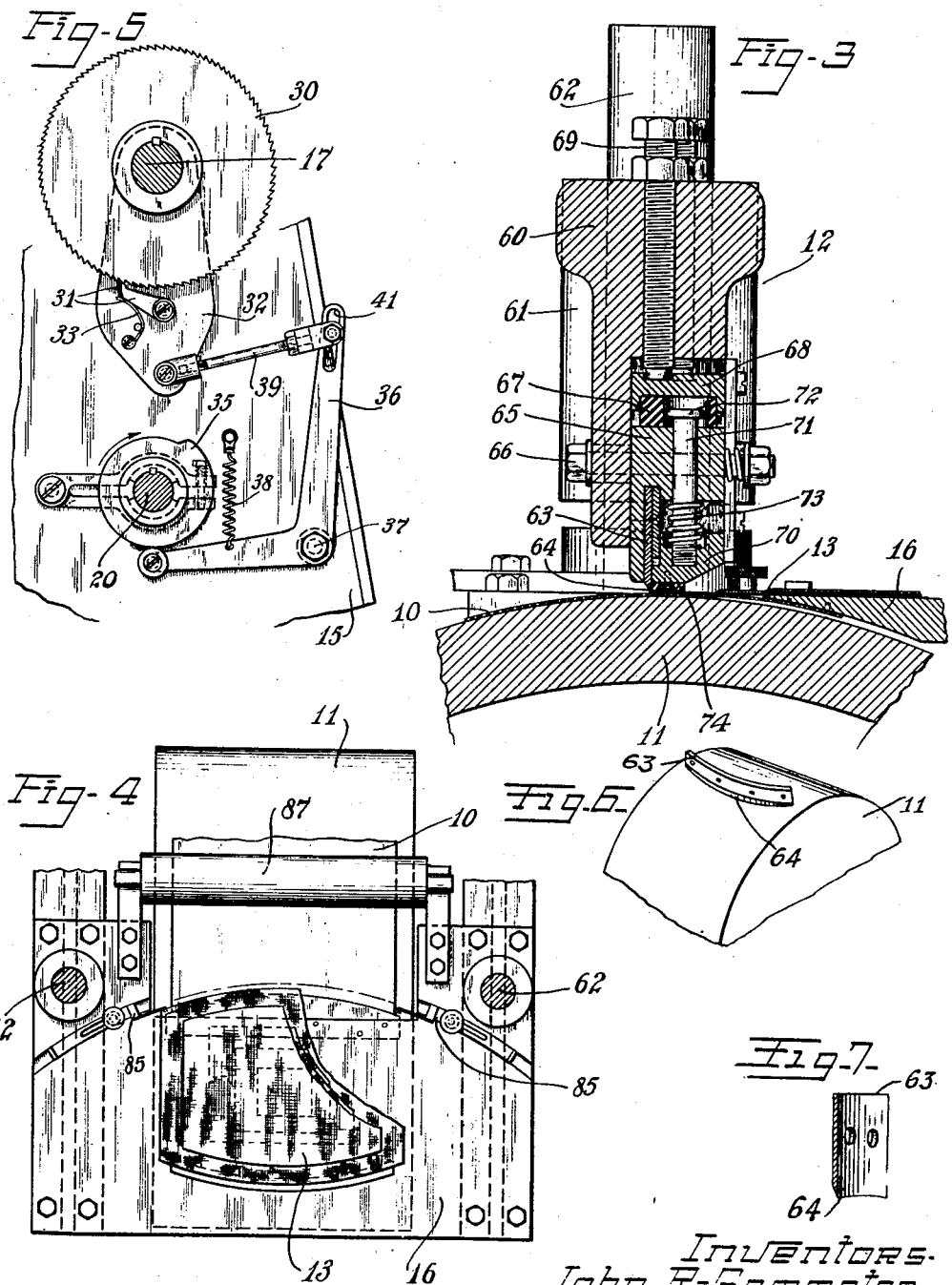

1,755,926

UNITED STATES PATENT OFFICE

CHARLES W. LEGUILLON AND JOHN R. GAMMETER, OF AKRON, OHIO, ASSIGNORS TO THE B. F. GOODRICH COMPANY, OF NEW YORK, N. Y., A CORPORATION OF NEW YORK

APPARATUS FOR APPLYING MARGINAL STRIPS TO ARTICLES

Application filed May 21, 1924. Serial No. 714,904.

This invention relates to the art of attaching marginal binding strips of unvulcanized rubber and the like to rubberized fabric articles prior to vulcanization and is of particular value in the manufacture of laminated rubberized fabric blow-out patches for forming and applying thereto marginal bindings.

A general object of our invention is to provide an improved, labor-saving and time-saving apparatus for forming blanks from sheet material and attaching them to the marginal portions of substantially flat articles in a single operation. A more specific object is to provide a simple and efficient apparatus for simultaneously forming and applying strips of plastic material such as unvulcanized rubber to the marginal portions of laminated rubberized fabric articles to give to the articles when vulcanized a thin finished edge.

Of the accompanying drawings:

Fig. 1 is a view in elevation of an end of a preferred form of an apparatus capable of carrying out our invention;

Fig. 2 is a view in elevation of a side of apparatus of Fig. 1;

Fig. 3 is a fragmentary view in section on line 3—3 of Fig. 2;

Fig. 4 is a view in plan of the platen guides and work, parts being omitted to show more clearly these elements;

Fig. 5 is a detailed view in elevation of the pawl and ratchet mechanism for intermittently rotating the platen in measured movements;

Fig. 6 is a fragmentary perspective of the platen and a knife associated therewith; and Fig. 7 is a sectional elevation of the knife.

Briefly, our invention, in the specific form herein described, comprises cutting from the end of a sheet or continuous web of unvulcanized rubber, strips of requisite width, either arcuate or rectangular or of other conformation, and in the same operation adhesively attaching them by pressure successively to the margins of laminated rubberized fabric articles, or other articles to which it is desired to give on vulcanization a durable finished edge.

Referring to the drawings, 10 is a sheet or strip of unvulcanized rubber of requisite width which is conveyed on a platen 11 to a shearing press 12 of special construction, where the severed strips are attached by pressure to the article 13. The platen 11 and the shearing press 12 are mounted upon a suitable frame, which as shown comprises a base 14, upright pedestals 15 and a table 16.

The platen 11 is cylindrical in form and is mounted on a horizontal axle shaft 17 journaled in suitable bearings 18 in the pedestals 15. Below the platen cylinder 11 is disposed a main driving shaft 20, also journaled in bearings 21 in the pedestals 15. The shaft 20 is continuously rotated by any suitable power means. In the apparatus illustrated, we show a motor 23 connected through a train of gears 24 to the gear 25 which is mounted to run freely on the shaft 20. Cooperating clutch members 26, 27, the former secured to the gear 25 and the latter fixed with a sliding key to the shaft 20, serve when in engagement to transmit the rotary movement of the gear 25 to the shaft 20. The slidable clutch member 27 is adapted to be thrown out of engagement by the depression of a foot pedal 28 connected thereto in a conventional manner. A spring 29 normally holds the foot pedal 28 in an elevated position and consequently the clutch members 26 and 27 in engagement.

Intermittent rotational movements are imparted to the platen cylinder 11 by an indexed step-by-step mechanism. As shown, this comprises a ratchet wheel 30 keyed to the shaft 17 at one side the platen cylinder 11 and pawls 31 carried by arm 32, the latter mounted at one end to ride freely on the shaft 17 and connected at the other end to operating mechanism presently to be described. The arm 32 carries a spring 33 which yieldingly holds the free ends of the pawls 31 in contact with the teeth of the ratchet wheel 30. The main driving shaft 20 has secured thereto a cam 35 against which one end of a bell crank lever 36, pivotally supported on the pedestal 15, as at 37, is resiliently held by means of a spring 38. A link 39 connects the other end of the bell crank lever 36 to the free end of the arm 32. The arrangement is such that during each revolution of the main driving shaft 20 a short rotational movement is imparted to the platen cylinder 11. Suitable means are provided for adjusting the extent of the intermittent movements of the platen, as for example, the bell crank may be slotted, as at 41, and the link 39 constructed to be secured therein in different positions so as to vary the effective throw of the bell crank lever.

At the end of the drum opposite to the pawl and ratchet mechanism, we may provide a friction brake for the platen cylinder, indicated generally at 43, which is adjusted to prevent the inertia of motion of the platen cylinder from continuing the rotational movement thereof at the termination of the advance stroke of the pawls 31, and to give the platen cylinder stability during the operations on the work. Briefly, the brake consists of a drum 44 secured to the platen shaft 17 and shoes 45 held in frictional contact with the drum 44 by bands 46 and 47. The latter are each hinged at one end about a pin 48 secured in the adjacent pedestal 15, and resiliently held in spaced relation at their other ends by bolt 49, spring 50 and thumb nut 51. The action of the brake 43 may thus be adjusted by a manipulation of the thumb nut 51 in a manner well understood in the machine art.

The shear press 12 consists of a cross head 60 having at each end bearings 61 coacting with the vertical guide rods 62, the latter being secured to the table 16. A knife 63 having a cutting edge 64 is of such conformation as to shear from the end of the web of rubber 10 a strip having the desired shape, and, as shown, is arcuate in form. The knife 63 is carried by a retainer member 65 adjustably secured in the cross head 60 by bolts 66. A pressure counter to the shearing force is resiliently applied to the retainer 65 through the intermediary of a cushion 67, a bar 68 and set bolts 69. The latter may be adjusted to vary and to equalize the pressure applied to the retainer 65.

A presser foot 70 is disposed rearwardly of the knife 63 and is yieldingly held in position by guide rods 71 secured to the presser foot 70 and rising upwardly therefrom through aligned openings in a rearwardly extending portion of the retainer 65. The guide rods 71 are provided with heads 72 at their upper ends and are encircled at their lower ends by springs 73 under compression, which tend to force the presser foot away from the retainer 65, and below the cutting edge of the knife 63. This movement of the presser foot is limited by the heads 72 of guide rods 71 contacting with the upper surface of the retainer 65. A removable strip 74 may be secured to the under surface of the presser foot for convenience of repair or resurfacing of the part of the presser foot which is subjected to the contact with the work.

A vertically reciprocating motion is given to the cross head 60 and its associated knife and presser foot by draw rods 80 which are pivotally secured at their upper ends 81 to the extremities of the cross head 60 and at their lower ends to the eccentrics 82 carried on the main driving shaft 20, in a manner common in machine design. The eccentrics 82 and the cam 35 are so disposed relatively to each other that movement is transmitted to the platen cylinder when the cross head 60 is in an elevated position.

The table 16 upon which the articles are placed during the severing and attaching operations is provided with guides 85 which are adjustable and which serve to assist the operator in the accurate positioning of the article 13. Preferably, the guides 85 should be so set that one edge of the article 13 will overlie the end of the rubber sheet 10 in uniformly spaced relation from the knife 63. Brackets 86 are also preferably provided to hold a roll of the unvulcanized rubber 10 in convenient relation to the platen cylinder. A roller 87 may also be disposed in guides secured to the table 16 in such manner that the weight of the roll upon the rubber sheet brings it into close contact with the platen prior to the shearing and attaching operation.

Briefly, the operation of the above described apparatus is as follows: The sheet of unvulcanized rubber 10 is conveyed from the roll onto the platen cylinder 11 and advanced in predetermined intermittent movements by the ratchet and pawl mechanism such that an amount of the sheet 10 is advanced beneath the knife and presser foot, when the latter are in an elevated position, equal to the width of the desired binding strip. As the cross head descends toward the platen 11, the lower end of the presser foot is slightly in advance of the knife edge and serves both to protect the cutting edge from contact with the work being placed in position on the table 16 and to press the article 13, which has been correctly positioned by the operator with the assistance of guides 85, against the end of rubber sheet 10. The shearing action of the knife 63 follows almost simultaneous with the application of pressure to the article 13 and the end of the rubber sheet 10 and upon the elevation of the cross head 60, the article and the severed rubber strip adhesively attached together, are removed by the operator. The apparatus is now ready for a succeeding and similar operation which may consist of applying a strip to the margin of the same or different article. Normally, in the manufacture of blow-out patches, it is desirable to apply the marginal rubber strip to the two opposite edges only of the blow-out patch which in use are disposed within the tire casing, but it is obvious that all four edges of an article could be so treated, if desired.

The speed of the operation is limited only by the time required for the operator to position the article to which the marginal strip is to be attached and to remove the article after the operation. There thus results a great saving in time and labor in the application of the rubber strip to the margins of the article, and furthermore a uniform product is obtained.

Modifications may be resorted to within the scope of this invention and we do not wholly limit our claims to the exact construction described.

We claim:

1. Apparatus for cutting sheet material, the said apparatus comprising a platen member having a non-plane work-supporting surface and a cutter shaped to cut against the said non-plane surface as a backing simultaneously throughout a length of a line of cut which length is non-rectilinear as viewed from a direction normal to the said non-plane surface.

2. Apparatus for forming a strip of sheet material and applying it to the margin of a piece of sheet material, the said apparatus comprising a platen member formed with a non-plane work-supporting surface, means for supporting the piece with a margin thereof overlapped with relation to the margin of a sheet of material spread upon the said non-plane work-supporting surface of the platen, means for pressing the two margins together, and means for cutting the said sheet of material against the said work-supporting surface as a backing, the said cutting means being formed to fit thereagainst at the same time throughout a length of a line of cut which length is non-rectilinear as viewed from a direction normal to the said surface.

3. Apparatus for applying a marginal strip to a piece of sheet material, the said apparatus comprising a platen member formed with a cylindrical surface and mounted for rotation, means for supporting a piece of sheet material with a margin thereof in overlapped relation to a margin of a sheet of material spread upon the said cylindrical surface, and a cutter mounted to act against the said cylindrical surface as a backing and so formed as to act thereagainst simultaneously throughout a curved length of a line of cut thereon.

4. In apparatus of the character described the combination of a rotary platen member formed on its periphery with a work-supporting surface curved in a circumferential direction and a cutter mounted to act against the said surface as a backing and having a cutting edge so curved as to fit against the said curved work-supporting surface at the same time throughout a curved length of a line of cut thereon.

5. Apparatus for applying marginal strips of rubber to pieces of fabric, the said apparatus comprising means for supporting successive pieces of fabric with a margin of each piece overhanging therefrom in a determinate, fixed position, a platen member mounted for such movement as to present in overlapped relation to the said margin the margin of a sheet of rubber mounted in extended condition upon said platen member with the said margin of the rubber sheet snugly fitting against the platen member, and a presser member and a cutter mounted to act concurrently to press the two margins together and to sever the rubber sheet closely adjacent the presser member to leave a marginal strip of rubber adhering to the piece of fabric, and means for so moving the platen member after each severing operation as likewise to present to each of the successive pieces of fabric the cut margin of the residue of the sheet of rubber while the latter remains in the same relative position thereon.

6. Apparatus as defined in claim 5 in which the platen member is mounted for rotation and is formed with a work-supporting surface curved in a circumferential direction and in which the cutter is so formed as to act against the said curved work-supporting surface as a backing at the same time throughout a curved length of a line of cut thereon.

7. Apparatus for applying marginal strips of rubber to pieces of fabric, the said apparatus comprising an even surfaced platen member adapted to support a sheet of rubber in smoothly spread condition upon its face, means for supporting a piece of fabric with a margin of the fabric overhanging therefrom and in overlapped relation to a margin of the rubber sheet, a presser, a cutter, a mounting common to the presser and the cutter and movable from and toward the platen member to actuate the presser and the cutter against the platen member as a backing, to press the two margins together and to sever the rubber along the said margins, the presser being movable upon said mounting, and yielding means urging the presser member toward an advanced position with relation to the cutter.

8. Apparatus as defined in claim 7 in which the platen member is formed with a cylindrical work-supporting surface and is mounted for rotation to bring the margin of the residue of the sheet of rubber to a determinate pressing and cutting position after each severing operation.

9. In apparatus of the character described the combination of a rotatable platen member journaled on a horizontal axis, a reciprocating cutter adapted to act against said platen member near the top of the latter's orbit, and means for feeding onto the platen member near the top of the latter's orbit but at a substantial distance from the cutter a strip of sheet material to be cut.

10. A combination as defined in claim 9 in which the platen member is formed with a curved surface against which the cutter acts and in which the cutter is formed with a cutting edge curved complementally to fit simultaneously throughout its length against the said curved surface.

11. In apparatus of the character described the combination of a rotary platen member formed with an outwardly facing peripheral surface for carrying a sheet of material in spread condition thereon and a cutter so constructed and mounted for reciprocative movement as to cut the said material against the said surface as a backing.

In witness whereof we have hereunto set our hands this 19th day of May, 1924.

JOHN R. GAMMETER.
CHARLES W. LEGUILLON.